3,371,551
NUT AND SCREW MECHANISM

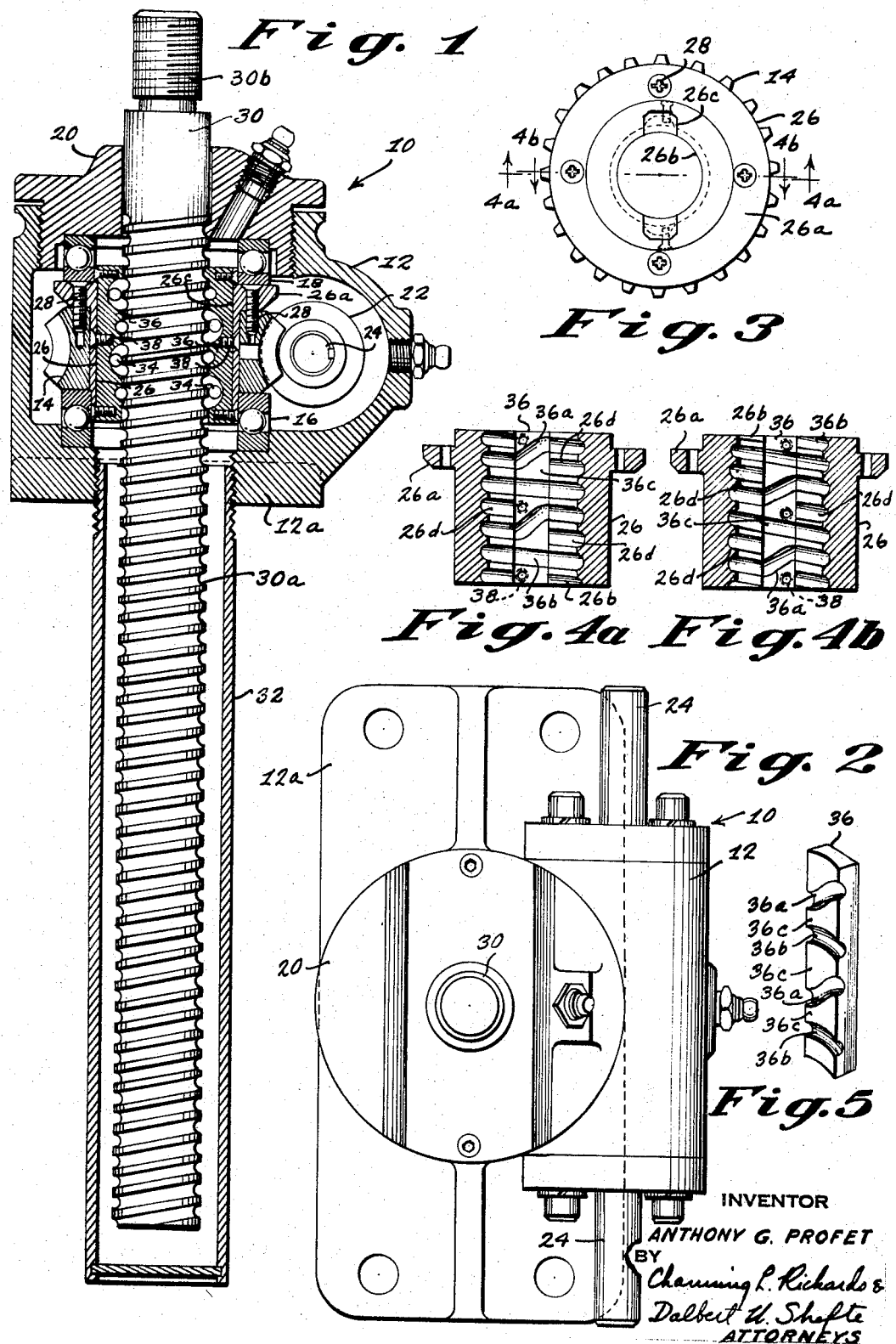

Anthony G. Profet, Charlotte, N.C., assignor to Duff-Norton Company, Charlotte, N.C., a corporation of North Carolina
Filed Sept. 1, 1966, Ser. No. 576,695
11 Claims. (Cl. 74—424.8)

The present invention relates to a nut and screw mechanism, and more particularly to a nut and screw mechanism in which a nut member and a screw member are drivingly connected by bearing elements circulating in mating threads of the members with bearing element return grooves formed in longitudinal insert members seated in one of the nut and screw members to provide a plurality of closed circuits for recirculation of the bearing elements in a manner that provides efficient and uniform load bearing characteristics with a compact and simplified construction.

Briefly described, the nut and screw mechanism of the present invention includes a screw member that has a helically threaded exterior surface, a nut member having a helically threaded interior surface mating with the aforesaid screw member threaded surface, and a plurality of bearing elements disposed for circulation in the threads of the mating helical surfaces for drivingly connecting the nut and screw members. One of the nut and screw members is formed with a plurality of longitudinally extending, threaded interrupting, recesses in the threaded surface thereof, with the recesses being longitudinally coextensive for interruption of a plurality of common thread revolutions. An insert member is seated in each of the recesses and has a plurality of return grooves formed thereacross with each groove connecting adjacent interruptions of the thread revolutions such that the grooves form a plurality of return paths for the bearing elements across the thread crests of the other of the nut and screw members to provide a plurality of closed circuits for recirculation of the bearing elements.

By this arrangement of a plurality of longitudinally coextensive insert members, a plurality of independent bearing element circuits are provided with the non-load-bearing return grooves disposed at annularly spaced locations, rather than being all disposed in longitudinal alignment as would be the case if only a single insert member were used. As a result, the present invention provides relatively uniform annular loadbearing characteristics for more efficient operation and enhanced wear life. In addition, the mechanism is easy to manufacture as the screw or nut member in which the insert members are to be seated requires only simple slotting to provide the recesses for the insert members, and the insert members can be easily manufactured independently and assembled readily in the recesses in proper thread alignment. Further, as the insert members are disposed in the recesses within the nut or screw member, no enlargement of the overall size of the mechanism is necessary to accommodate the bearing element return feature, such that the mechanism is compact, particularly in comparison with a mechanism of the type having an exterior bearing element return conduit.

In the preferred embodiment of the present invention, the foregoing nut and screw mechanism is incorporated in a ball screw jack mechanism that utilizes ball bearing elements to drivingly connect the nut and screw members. The nut member of this mechanism is formed with a pair of diametrically opposed recesses for seating of a pair of insert members therein. The return grooves formed in one of the insert members are in longitudinal alternation with the return grooves of the other insert member so that alternate ball bearing circuits have their non-loadbearing returns in diametrically opposed relation for balanced uniform operation. The insert members are additionally formed with helical thread segment grooves extending across the insert members and in alternation with the return grooves. These thread segment grooves are diametrically opposite the return grooves of the opposite insert member and form loadbearing segments of the ball bearing circuits, thereby providing continuous and efficient annular loadbearing in the mechanism. Further, each insert member is formed with ungrooved portions transversely adjacent the return grooves. These ungrooved portions form reinforcements in the insert members so that sufficient strength is obtained to permit the insert members to be made relatively thin to fit in a nut member of conventional thickness without enlargement. Not only is uniform continuous loadbearing provided by this mechanism, but, also the use of a plurality of axially spaced ball bearing element circuits extends the driving connection of the nut and screw members axially, thereby providing axial stability of the mechanism during operation.

For purposes of illustration, the preferred embodiment of the present invention is described in detail hereinbelow with reference to the accompanying drawings, in which:

FIG. 1 is a vertical diametrical sectional view of a ball screw jack mechanism incorporating the preferred embodiment of the present invention;

FIG. 2 is a plan view of the ball screw jack mechanism of FIG. 1;

FIG. 3 is a plan view of the worm gear nut assembly of the embodiment of FIG. 1;

FIGS. 4a and 4b are opposite vertical sectional views of the opposing but members of the assembly of FIG. 3 taken along lines 4a—4a and 4b—4b, respectively, of FIG. 3; and FIG. 5 is a perspective view of the insert member of FIG. 4a.

In the embodiment illustrated, the nut and screw mechanism of the present invention is shown incorporated in a ball screw jack mechanism 10 of the worm gear type. This jack mechanism 10 has a housing 12 that contains the various elements of the mechanism and has a bottom flange 12a for mounting on a platform or other support. An annular drive member, in the form of a worm gear 14 is seated in the housing 12 for rotation therewith between spaced bearings 16 and 18, with the upper bearing 18 being retained in worm gear retaining position by a housing cap 20 that is threadably attached to the housing 12.

The worm gear 14 is driven by drive means in the form of a worm 22 that is keyed for rotation on a drive shaft 24, which shaft is supported in the housing 12 and extends outwardly therefrom for connection to a conventional power source (not shown).

Seated in the annular interior of the worm gear 14 is an annular nut member 26 that extends therebeyond into the confines of the bearings 16 and 18 and has an annular flange 26a projecting radially outward above the worm gear 14 for seating between the worm gear 14 and upper bearing 18. The nut member 26 is secured to the worm gear 14 for rotation therewith by screws 28 extending through the nut member flange 26a into the worm gear 14.

The nut member 26 is further formed with a helically threaded interior surface 26b that mates with the helically threaded exterior surface 30a of a screw member 30 that extends axially through the nut member 26 and housing 12 and has a threaded upper end 30b for non-rotating attachment to a load. The screw member 30 extends downwardly from the housing 12 into a protective tubular sleeve 32 that is threaded into the bottom flange 12a of the housing.

Driving connection of the screw member 30 to the nut member 26 is accomplished by ball bearing elements 34 confined in the mating helical surfaces 26b and 30a of the nut member 26 and screw member 30, respectively, to transmit rotation of the nut member 26 into non-rotating axial movement of the screw member 30.

The nut member 26 is longitudinally slotted along its interior helically threaded surface 26b to form a pair of longitudinally extending, thread interrupting, recesses 26c disposed in diametrically opposed relation. The recesses 26c are longitudinally coextensive for interruption of a plurality of common thread revolutions of the nut member threaded surface 26b. In the embodiment illustrated, the recesses 26c extend the full length of the nut member 26.

The recesses 26c are formed for the purpose of seating a pair of insert members 36 in diametrically opposed relation. These insert members 36 are of a thickness substantially equivalent to the depth of the recesses 26c so that the faces of the insert members 36 are generally flush with the interior surface 26b of the nut member 26.

Each of the insert members 36 has formed on its face a plurality of ball bearing element return grooves 36a that extend transversely across the insert members 36, with each return groove 36a connecting adjacent interruptions of the thread revolutions of the nut member interior surface 26b to form a single revolution path with the thread revolution that is interrupted thereby, and each return groove 36a is of sufficient depth centrally to allow the ball bearing elements 34 to travel therein across the insert member 36 over the thread crests of the screw member exterior surface 30a; thus a plurality of single revolution closed circuits are provided for the travelling ball bearing elements 34.

The return grooves 36a are spaced apart longitudinally on each insert member 36 at least two full thread spaces. In the illustrated embodiment the return grooves 36a are spaced three thread spacings apart to accommodate helical thread segment grooves 36b that extend transversely across the insert members 36 in alternation with the return grooves 36a. These thread segment grooves 36b are aligned with thread revolution interruptions of the nut member interior surface 26b to form helical continuations of the interrupted thread revolutions for load bearing support of the ball bearing elements 34 across the insert members 36. Each thread segment groove 36b is diametrically opposite a return groove 36a of the opposite insert member 36 to form therewith a complete single revolution closed circuit for a set of ball bearing elements 34.

As the helical groove segments 36b are in alternation with the return grooves 36a of the same insert member 36 and are diametrically opposite the return grooves 36a of the other insert member 36, the return grooves 36a of one insert member are in longitudinal alternation with the return grooves 36a of the other insert member 36, such that the non-loadbearing return paths for alternate ball bearing element circuits are diametrically opposed as are the alternate loadbearing circuit continuations formed by the groove segments 36b. This results in a balanced, efficient and uniform operation with continuous annular loadbearing support.

As the return grooves 36a connect adjacent thread revolution interruptions while the thread segment grooves 36b form continuations across single thread revolution interruptions, three thread interruptions are required for each set of one return groove 36a and one thread segment groove 36b while this set forms only two recirculation circuits. This results in portions 26d of the thread revolutions being unused for ball bearing element circulation. This result is used to advantage in the illustrated embodiment of the present invention by forming the portions of the insert members 36 adjacent these unused thread revolution portions 26d as ungrooved reinforcing portions 36c transversely adjacent the return grooves 36a, thereby providing added strength in the insert members 36 so that the insert members can be made sufficiently thin to seat in a conventional size nut member 26 and worm gear 14 without requiring enlargement of standard size parts.

The aforementioned arrangement of two closed circuits for each three thread revolutions also advantageously extends the overall axial length of the plurality of circuits, which provides enhanced axial stability of the driving connection between the nut member 26 and the screw member 30.

The present invention also has an advantage in manufacture as the nut member 26 requires no complicated machining to form seats for the insert members 36, requiring only simple straight slotting, and the insert members 36 are independently manufactured, as by casting, and then simply placed in the recesses 26c in thread alignment and secured in place by screws 38. Further, as seen in FIGS. 4a and 4b, both insert members 36 of each pair are identically formed, but reversed in assembled position in the nut member 26, thus only a single pattern is needed for all insert members and no separate supplies or pairing are needed.

Although the insert members 36 have herein been described and illustrated in relation to seating in the nut member interior surface 26b, they could be formed for seating in the screw member exterior surface 30a should there be an advantage in manufacture or design in some circumstances. Also, it might, in some case, be desirable to utilize more than two insert members in each mechanism, or use bearing elements other than balls.

This invention has been described in detail above for purposes of illustration only and is not intended to be limited by this description or otherwise except as defined in the appended claims.

I claim:

1. A nut and screw mechanism comprising a screw member having a helically threaded exterior surface, a nut member having a helically threaded interior surface mating with said screw member threaded surface, a plurality of bearing elements disposed for circulation in the threads of said mating surfaces, for drivingly connecting said members, one of said screw and nut members having a cesses being longitudinally coextensive for interruption recesses formed in said threaded surface thereof, said recesses being longitudinally coextensive for interruption of a plurality of common revolutions of the threads of the surface of the member in which they are formed, and an insert member seated in each of said plurality of recesses and having a plurality of return grooves formed thereacross with each groove connecting adjacent interruptions of said thread revolutions to form a return path for said bearing elements across the thread crest of the other of said screw and nut members for closed circuit recirculation of said bearing elements.

2. A nut and screw mechanism according to claim 1 and characterized further in that said insert members are additionally formed with helical thread segment grooves extending thereacross in alternation with said return grooves, each said thread segment groove forming a continuation of one of said thread revolution interruptions for load-bearing circulation of said bearing elements across said insert members.

3. A nut and screw mechanism according to claim 1 and characterized further in that said return grooves are spaced longitudinally along said insert members at least two thread spacings apart and said insert members have ungrooved reinforcing portions transversely adjacent each return groove.

4. A nut and screw mechanism comprising a screw member having a helically threaded exterior surface, a nut member having a helically threaded interior surface mating with said screw member threaded surface, a plurality of bearing elements disposed for circulation in the threads of said mating surfaces for drivingly connecting said members, one of said screw and nut members having a pair of longitudinally extending, thread interrupting, recesses formed in said threaded surface thereof, said recesses being diametrically opposed and longitudinally coextensive for interruption of a plurality of common revolutions of the threads of the surface of the member in which they are formed, and a pair of insert members seated in said recesses, each said insert member having a plurality of return grooves formed thereacross with each groove connecting adjacent interruptions of said thread revolutions to form a return path for said bearing elements across the thread crest of the other of said screw and nut members for closed circuit recirculation of said bearing elements.

5. A nut and screw mechanism according to claim 4 and characterized further in that said return grooves of one insert member are disposed in longitudinal alternation with respect to the return grooves of the other of said insert members.

6. A nut and screw mechanism according to claim 5 and characterized further in that said insert members are additionally formed with helical thread segment grooves extending thereacross in alternation with said return grooves, each said thread segment groove being diametrically opposite a return groove of the other insert member and forming a continuation of the circuit connected by the opposite return groove for load-bearing circulation of said bearing elements in said thread segment grooves across said insert members.

7. A nut and screw mechanism according to claim 6 and characterized further in that said insert members have ungrooved reinforcing portions transversely adjacent each return groove.

8. A ball screw jack mechanism comprising a housing, an annular drive member seated in said housing for rotation therein, means for driving said annular drive member, a nut member seated in said annular drive member for rotation therewith, said nut member having a helically threaded interior surface, a screw member extending through said housing and nut member and having a helically threaded exterior surface mating with said nut member threaded surface, a plurality of ball bearing elements disposed for circulation in the threads of said mating surfaces for drivingly connecting the screw member to said nut member, said nut member having a plurality of longitudinally extending, thread interrupting, recesses formed in said threaded surface thereof, said recesses being longitudinally coextensive for interruption of a plurality of common revolutions of the threads of the nut member surface, and an insert member seated in each of said plurality of recesses and having a plurality of return grooves formed thereacross with each groove connecting adjacent interruptions of said thread revolutions to form a return path for said ball bearing elements across the thread crest of said screw member surface for closed circuit recirculation of said ball bearing elements.

9. A ball screw jack mechanism according to claim 8 and characterized further in that said plurality of nut member recesses is a pair of diametrically opposed recesses, and there are a pair of said insert members with one insert member in each of said recesses.

10. A ball screw jack mechanism according to claim 9 and characterized further in that said return grooves of one of said pair of insert members are disposed in longitudinal alternation with respect to the return grooves of the other of said insert members wtih each of said return grooves connecting adjacent thread revolution interruptions to form an individual, single revolution, ball bearing element circuit, and said insert members are additionally formed with helical thread segment grooves extending thereacross in alternation with said return grooves, each said thread segment groove being diametrically opposite a return groove of the other insert member and forming a continuation of the circuit connected by the opposite return groove for load-bearing circulation of said ball bearing elements in said thread segment grooves across said insert members.

11. A ball screw jack mechanism according to claim 10 and characterized further in that said insert members have ungrooved reinforcing portions transversely adjacent each return groove.

References Cited
UNITED STATES PATENTS

| | | | |
|---|---|---|---|
| 3,178,958 | 4/1965 | Beck | 74—424.8 |
| 3,261,224 | 7/1966 | Anthony | 74—459 |
| 3,301,082 | 1/1967 | Kosinski | 74—424.8 |

DONLEY J. STOCKING, *Primary Examiner.*

LEONARD H. GERIN, *Examiner.*

UNITED STATES PATENT OFFICE

CERTIFICATE OF CORRECTION

Patent No. 3,371,551                                    March 5, 1968

Anthony G. Profet

It is certified that error appears in the above identified patent and that said Letters Patent are hereby corrected as shown below:

Column 1, line 29, "threaded", first occurrence, should read -- thread --. Column 2, line 33, "but" should read -- nut -- Column 4, line 43, cancel "cesses being longitudinally coextensiv for interruption" and insert -- plurality of longitudinally extending, thread interrupting --. Column 6, line 20, "wtih" should read -- with --.

Signed and sealed this 19th day of August 1969.

(SEAL)
Attest:

Edward M. Fletcher, Jr.                      WILLIAM E. SCHUYLER, JR.

Attesting Officer                                  Commissioner of Patents